United States Patent [19]

Mitchell

[11] 4,289,344
[45] Sep. 15, 1981

[54] RAKES

[76] Inventor: Peter J. D. Mitchell, 60 Betham Rd., Greenford, Middlesex, England

[21] Appl. No.: 55,499

[22] Filed: Jul. 6, 1979

[30] Foreign Application Priority Data

Dec. 6, 1978 [GB] United Kingdom ............... 47377/78

[51] Int. Cl.³ .............................................. A01D 7/06
[52] U.S. Cl. .................................... 294/2; 56/400.19; 172/372; 172/378; 294/19 A; 294/53.5
[58] Field of Search ................ 294/2, 24, 19 R, 19 A, 294/51, 52, 53.5; 56/400.01, 400.04, 400.11, 400.16, 400.19, 400.2; 172/371–375, 378, 380, 381; 273/32 B, 32 F, 162 R, 162 E, 162 F

[56]        References Cited
        U.S. PATENT DOCUMENTS 734,078   7/1903  Miller ........................... 56/400.19 X
1,657,322 1/1928  Shinn ................................. 172/372
2,110,538 3/1938  Walsh ........................... 294/19 A X
2,724,610 11/1955 Fitzgerald ..................... 294/19 A X
2,738,214 3/1956  Zimmers .......................... 294/19 A Primary Examiner—Johnny D. Cherry

[57]                ABSTRACT

A hand-held rake for golfers is made with a head having two portions one of which can pivot about the shaft of the rake from a working position in which it forms a continuation of the other head portion to a stowage position in which the head portions are in overlying relationship with their tines oppositely directed. The rake when stowed thus has the form of a golf club. The tines of each head portion can be arranged such that when the head portions overlie each other, the ends of the tines of each head portion lie shielded within the outline of the other head portion which facilitate handling of the rake.

10 Claims, 7 Drawing Figures

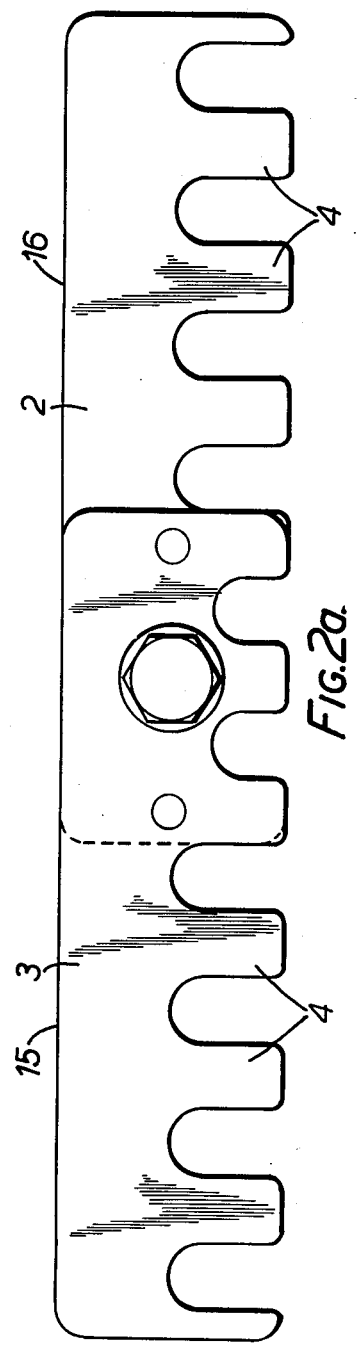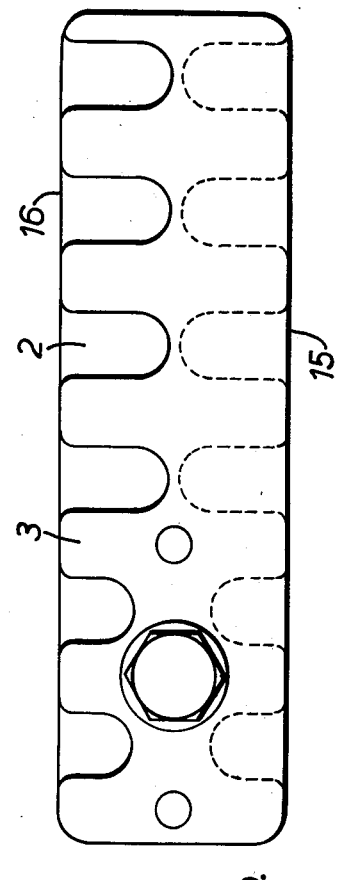

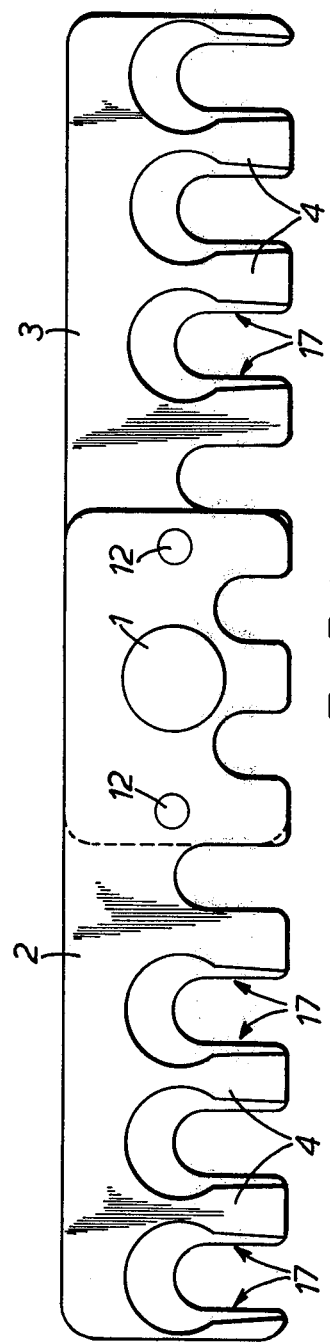
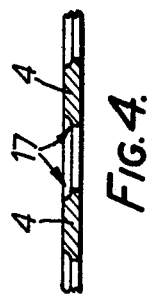

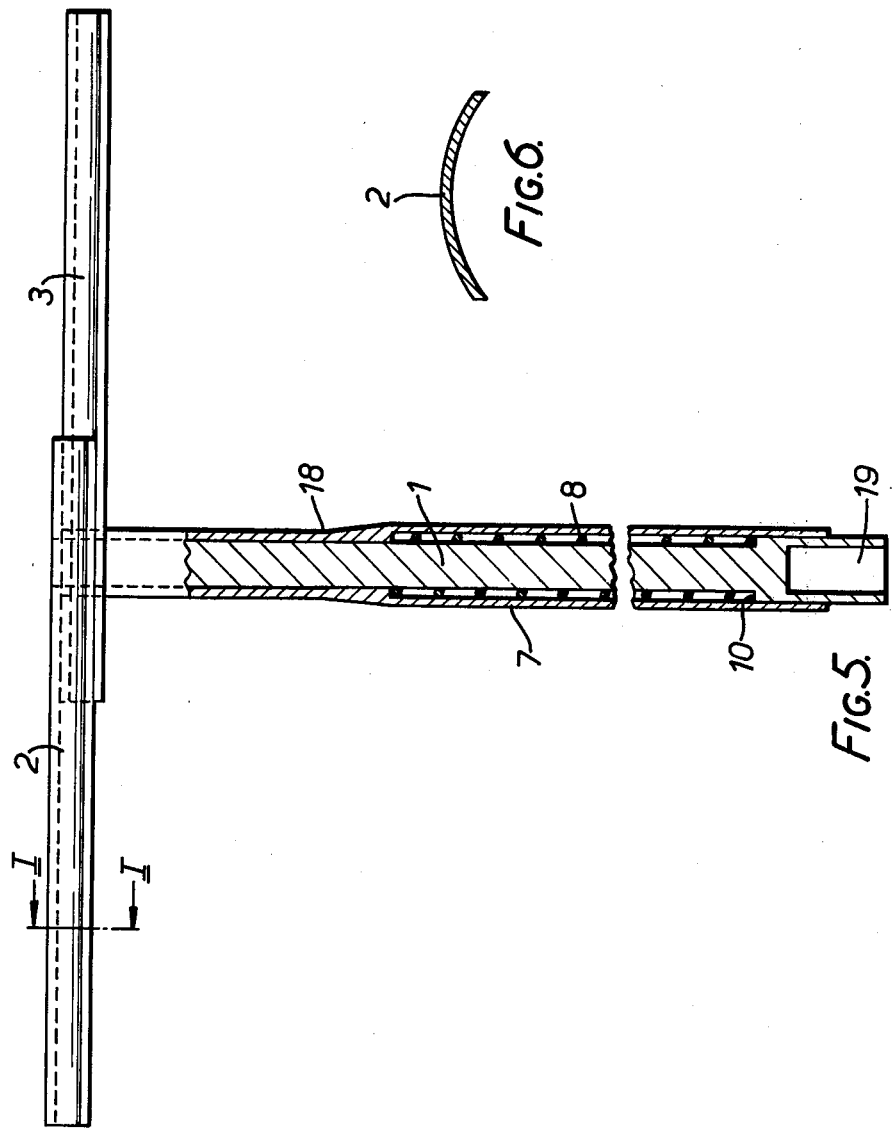

RAKES

BACKGROUND OF THE INVENTION

1. Field of the Invention

This invention relates to rakes and in particular but not exclusively to rakes for use by golfers and stowable in their golf bags.

2. Description of the Prior Art

Rakes are used by golfers to smooth out footprints and signs of play in the sand of bunkers and for this purpose rakes are often provided at bunker positions for general use. Rakes have also proved themselves useful to golfers for searching for lost balls in long grass and among leaves and also for retrieving balls lying in ditches, streams and other golfing hazards. However, since it is normally impracticable to carry a rake in a golf bag along with the clubs because of the awkward shape of the rake head, use of a rake for finding and retrieving balls has been limited to locations close to bunkers at which a rake has been provided.

In order to overcome the problem of stowage presented by the normal form of rake, it has been proposed in British Pat. No. 599,099 to divide the rake head into two portions pivotal about a common axis to fold back against the shaft of the rake. Such an arrangement has in practice a number of disadvantages including that the two head portions cannot fold back flat against the shaft because of the use of a common pivot axis. Furthermore, the stowed rake is bulky where the head portions are folded around the shaft and does not easily fit into a golf bag already holding a number of clubs.

SUMMARY OF THE INVENTION

According to one aspect of the present invention, there is provided a hand-held rake comprising a shaft handle being formed by two head portions which are each provided with times and which in a working configuration of the head extend in opposite directions substantially perpendicular to the shaft handle, said head portions being mounted on the shaft handle such that they can pivot relative to each other about an axis parallel to the handle to move between said working configuration and a stowage configuration in which the head portions are in overlying relationship with their tines facing in opposite directions.

Such a rake has a form in its stowed configuration similar to a putter and is readily slipped into a golf bag with the head providing a convenient means for handling.

To prevent catching of the tines on other clubs in a golf bag and for general convenience in handling, in the stowage configuration the ends of the tines of each head portion are shielded within the outline of the other head portion.

The head portions are preferably arranged to be positively located in their working and stowage configurations. Such positive location can be achieved either by providing discrete co-operating means on the two head portions or by curving the head portions such that their concavities face in the direction of extension of the handle. In the latter case, the curvature of the head portions can be arranged such that it facilitates the retrieval of golf balls since the concavities act as a seat for the golf balls. In other cases the tines can be profiled on the side of the rake head facing the shaft handle to conform to the shape of a golf ball and thereby provide a seat for the ball. The profiling can take the form of concave bevelling of the longitudinal edges of the tines and/or scalloping around the tine roots to provide a part-spherical recess.

According to another aspect of the invention, there is provided a hand-held rake comprising a shaft, a first tined head portion fixed to one end of the shaft, a second tined head portion pivotal about said shaft for movement between a working position in which the two head portions extend in opposite directions perpendicularly to the shaft and a stowage position in which the head portions are in overlying relation with their tines oppositely directed, and means releasably urging said second head portion toward said first portion, the head portions being curved such that their concavities face in the direction of extension of the shaft whereby the head portions positively locate within each other in said working and stowage positions under the action of said releasable urging means, movement of the second head portion between said positions being enabled by release of the urging of the second head portion toward the first head portion.

BRIEF DESCRIPTION OF THE DRAWINGS

A hand-held rake embodying the invention will now be particularly described, by way of example with reference to the accompanying diagrammatic drawings, in which:

FIGS. 2a and 2b are front elevations of the head of the rake respectively when configured for working and for stowage;

FIG. 3 is a rear elevation of the FIG. 2 head;

FIG. 4 is a cross-section through one of the rake head tines;

FIG. 5 is a plan view of a modified form of the rake; and

FIG. 6 is a section on line I—I of FIG. 5 on an enlarged scale.

Figure 1:
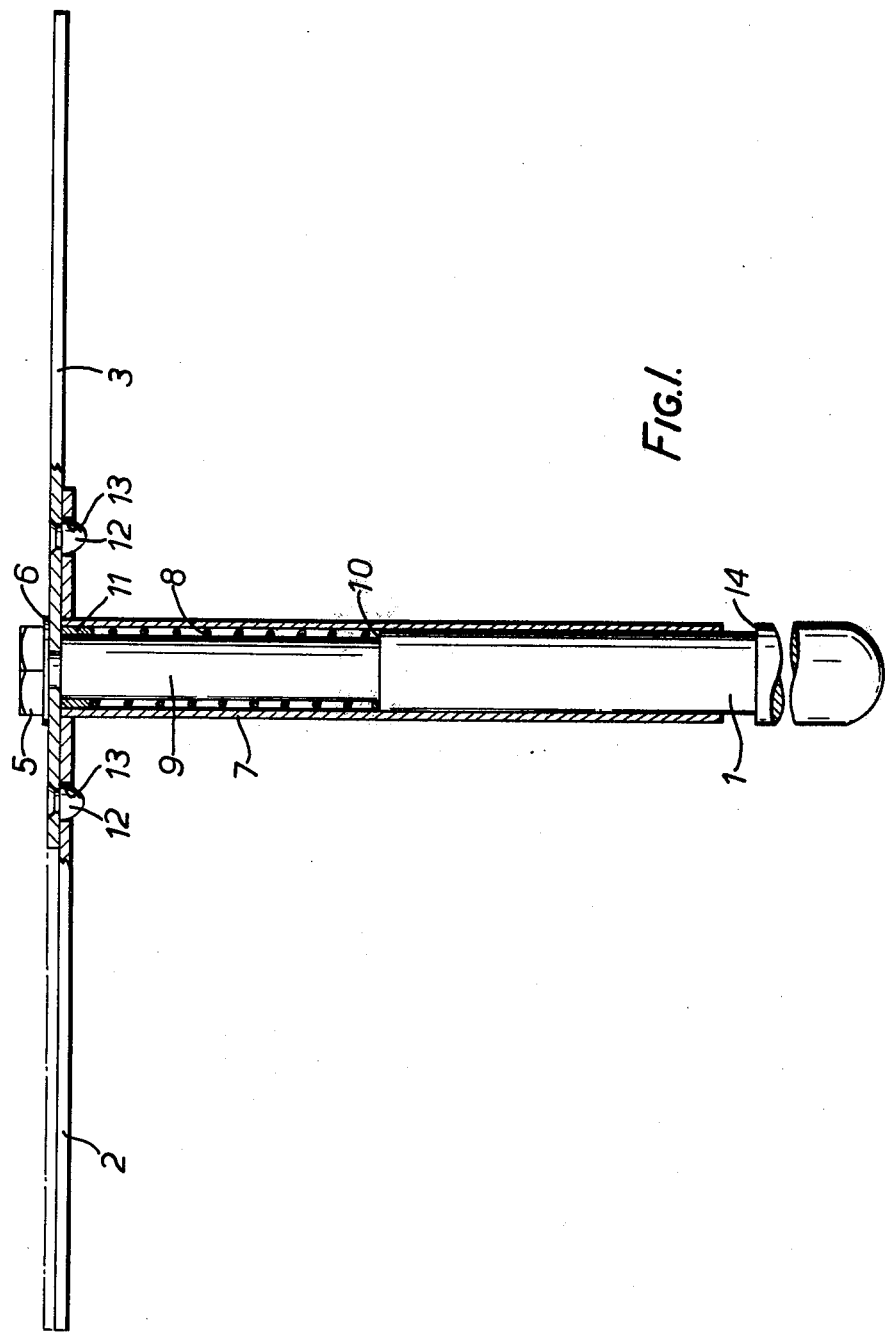
FIG. 1 is a plan view partly in section of the rake.

The rakes now to be described are primarily intended for use by golfers in smoothing sand in bunkers, and for looking for and retrieving golf balls; it will, however, be appreciated that they can be used for other purposes such as gardening.

As shown in FIGS. 1 to 4, the rake comprises a handle shaft 1 at one end of which is mounted a head extending at right-angles to the shaft. The head is formed by two similar head portions 2 and 3 both of which are provided with tines 4. When the rake is in a working configuration as shown in FIG. 1, the head portions 2 and 3 extend oppositely from the shaft 1 with their tines pointing in a common direction (see FIG. 2a).

The mounting of the two head portions 2 and 3 on the shaft 1 is such that they can be rotated relative to each other about the axis of the shaft 1 whereby to reconfigure the rake from its working state into a stowage configuration in which the two head portions 2 and 3 overlie each other (as shown in FIG. 2b and indicated by dashed lines in FIG. 1). In its stowage configuration the rake has a form similar to that of a putter and can readily be kept in a golf bag. The head in its stowed configuration is, for example, approximately 6 inches (15 cm) long and its presence facilitates removal and replacement of the rake from the golf bag.

To enable relative rotation of the head portions 2 and 3, one portion 3 is directly mounted on the end of the shaft 1 by a lock nut 5 and washer 6 engaging a threaded element (not shown) projecting from the end of the shaft 1. The other head portion 2 is made fast with a sleeve 7 which extends up the shaft 1 coaxially therewith. Gripping of the sleeve 7 allows the head portion 3 to be rotated relative to the head portion 2 by rotation of the shaft 1.

The head is arranged to be positively located in its working and stowage configurations and to this end a compression spring 8 is fitted over a reduced diameter end portion 9 of the shaft 1. The spring reacts between a shoulder 10 of the shaft 1 and a collar 11 fast with the head portion 2. The spring 8 is enclosed by the sleeve 7 which extends up the shaft 1 beyond the shaft end portion 9.

The head portion 3 carries two rounded studs 12 symmetrically positioned with respect to the axis of the shaft 1 and arranged to locate in two holes 13 provided in the head portion 2 when the head portions are in their working configuration and also when they overlie each other in their stowage configuration. The studs 12 and holes 13 constitute co-operating positive location means. The spring 8 which acts to urge the head portions 2 and 3 into engagement ensures that the head portions are positively locked in the working or stowage configuration with the studs 12 locating in the holes 13.

To release the head portions when changing from a working to a stowage configuration, or vice versa, the sleeve 7 is gripped and the shaft 1 is pushed axially towards the head. This causes the spring 8 to compress with the head portion 3 moving away from the head portion 2 and withdrawing the studs 12 from the holes 13. The shaft 1 can then be rotated to rotate the head portion 3 through 180° to alter the head configuration. Release of the shaft 1 allows the spring 8 to pull the head portions 2 and 3 together with the studs 12 relocating in the holes 13 (the rounded shape of the studs 12 facilitates this relocation).

It will be noted that the head portion 3 secured to the shaft 1 serves to retain the other head portion 2 and the sleeve 7 on the shaft 1 and any axial forces experienced by the head portion 2 during use are transmitted to the shaft 1 through either the head portion 3 or the spring 8.

To limit compression of the spring 8 when unlocking the head portions, the shaft 1 can be provided with a second shoulder 14 arranged to engage the end of the sleeve 7.

Although in FIG. 1 the sleeve 7 is indicated as being short relative to the overall length of the handle shaft 1, the sleeve 7 can be extended up the shaft to terminate just short of a handle grip provided at the end of the shaft 1 remote from the rake head. Such an arrangement enables reconfiguration of the head by gripping of the rake at the handle grip end only of the shaft 1.

The spring 8 can be replaced by other means for releasably urging the two head portions together, for example a nut engaging a threaded portion on the shaft 1 and abutting the sleeve 7 such that rotation of the nut can axially move the sleeve 7.

The common axis of pivoting of the head portions 2 and 3 lies either on or below the centreline of these portions (as viewed in FIG. 2a) such that after rotation from their working configuration into their stowage configuration (FIG. 2b) the tines 4 are shielded within the outline profile of the rake head; that is, the tines 4 of the head portion 2 do not extend beyond the continuous edge 15 of the head portion 3 and similarly the tines 4 of the head portion 3 do not extend beyond the continuous edge 16 of the head portion 2. Such an arrangement facilitates handling of the rake by its head when in its stowage configuration.

As illustrated in FIGS. 3 and 4, the longitudinal edges of the tines 4 are concavely bevelled on the side of the rake head facing towards the shaft 1 such that facing edges of adjacent tines 4 provide a profiled seat 17 for a golf ball being lifted by the rake. Shaping of the tines 4 in this manner facilitates the retrieval of golf balls from ditches, streams and ponds. Preferably the depth of the concave bevelling increases away from the distal end of each tine 4 so that a golf ball will tend to roll towards the roots of the two tines 4 forming a seat 17 for that ball. Scalloping between the roots of the tines 4 then provides a part-spherical recess acting as a deep seat for the ball. Where such seating for a golf ball is provided the head portions 2 and 3 are preferably at least 0.5 cm thick.

The handle shaft 1 can be made collapsible either telescopically or by being formed of two or more sections which fit together end to end in a manner allowing their disassembly when required (for example threaded connections are suitable).

In the modified form of rake shown in FIGS. 5 and 6, positive location of the head portions 2 and 3 in their working and stowage configurations is achieved by curving the head portions 2, 3 including the tines 4 about an axis parallel to their directions of extension when in the working configuration. The concave sides of the head portions 2, 3 face in the same direction as that in which the shaft 1 extends away from the head portions 2, 3. It will be appreciated that this curving of the head portions 2 and 3 will cause them to positively locate within each other under the effect of the spring 8 only when in their working or stowage configurations.

In addition, the curvature of the head portions 2, 3 is such that their concave sides act as a seat for a golf ball.

A narrower diameter portion 18 of the sleeve 7 is provided such that the spring 8 reacts between the narrower diameter portion 18 of the sleeve 7 and the shoulder 10 of the shaft 1. The portion of the shaft 1 below the shoulder 10 is provided with an opening 19 which can accommodate a handle.

I claim:

1. A hand held rake comprising a shaft handle with a head mounted at one end thereof, the head being formed by two head portions which are each provided with tines and which in a working configuration of the head extend in opposite directions substantially perpendicular to the shaft handle, said head portions being mounted on the shaft handle such that they can pivot relative to each other about an axis parallel to the handle to move between said working configuration and a stowage configuration in which the head portions are in overlying relationship with their tines facing in opposite directions, one said head portion being fixedly mounted on the shaft handle and the other said head portion being fast with a sleeve through which the shaft handle extends whereby said axis of pivoting is substantially coincident with the longitudinal axis of the handle.

2. A hand-held rake according to claim 1, in which in said stowage configuration the ends of the tines of each head portion lie shielded within the outline of the other head portion.

3. A hand-held rake according to claim 1, including spring means urging said head portion fast with the sleeve toward the head portion fixed to the shaft handle, and co-operating positive location means provided on the two head portions and engageable to positively locate the head portions in said working and stowage configurations under the action of the spring means, movement of the head portions between said configurations being effected by displacement of said head portion fast with the sleeve against the urging of the spring means to disengage the positive location means of the two head portions.

4. A hand-held rake according to claim 1, including spring means urging said head portion fast with the sleeve toward the head portion fixed to the shaft handle, the head portions being similarly curved about an axis parallel to said directions in which they extend in their working configuration such that their concavities face in the direction of extension of the shaft handle away from the head portions, said curving of the head portions serving to positively locate the head portions in their working and stowage configurations under the effect of the spring means.

5. A hand-held rake according to claim 1, in which the tines of each head portion are profiled on the side of the head portion facing toward the shaft handle to provide a profiled seat for a golf ball.

6. A hand-held rake according to claim 5, in which the longitudinal edges of the tines are concavely bevelled such that facing longitudinal edges of adjacent tines provide said profiled seat for a golf ball, the depth of said bevelling increasing toward the roots of the tines.

7. A hand-held rake according to claim 5 or claim 6, in which the roots of the tines are scalloped to provide part-spherical recesses serving to seat a golf ball.

8. A hand-held rake comprising a shaft, a first tined head portion fixed to one end of the shaft, a second tined head portion pivotal about said shaft for movement between a working position in which the two head portions extend in opposite directions perpendicularly to the shaft and a stowage position in which the head portions are in overlying relation with their tines oppositely directed, and means releasably urging said second head portion toward said first portion, the head portions being curved such that their concavities face in the direction of extension of the shaft whereby the head portions positively locate within each other in said working and stowage positions under the action of said releasable urging means, movement of the second head portion between said positions being enabled by release of the urging of the second head portion toward the first head portion.

9. A hand-held rake according to claim 8, in which the ends of the tines of each head portion are shielded within the outline of the other head portion when the second head portion is in its stowage position.

10. A hand-held rake according to claim 8 or claim 9 in which the concavities of the head portions are arranged to provide a seat for a golf ball.

* * * * *